United States Patent [19]

Dickson

[11] 4,043,965

[45] * Aug. 23, 1977

[54] COPOLYMER OF ACRYLIC ACID AND 1,1-DIHYDROPERFLUOROOCTYL METHACRYLATE USEFUL FOR APPLYING NON-PERMANENT SOIL RELEASE FINISH

[75] Inventor: Robert E. Dickson, Belle Mead, N.J.

[73] Assignee: Colgate-Palmolive Company, New York, N.Y.

[ * ] Notice: The portion of the term of this patent subsequent to Sept. 17, 1991, has been disclaimed.

[21] Appl. No.: 599,195

[22] Filed: July 25, 1975

Related U.S. Application Data

[63] Continuation-in-part of Ser. No. 414,880, Nov. 12, 1973, Pat. No. 3,912,681, which is a continuation-in-part of Ser. No. 249,089, May 1, 1972, Pat. No. 3,836,496.

[51] Int. Cl.$^2$ .................. C08F 218/10; C08L 31/02
[52] U.S. Cl. .................. 260/29.6 F; 260/29.6 H; 526/245
[58] Field of Search .......... 260/29.6 H, 89.5 H, 260/86.1 R, 29.6 F; 526/245

[56] References Cited

U.S. PATENT DOCUMENTS

| | | | |
|---|---|---|---|
| 2,642,416 | 6/1953 | Albrecht | 260/86.1 R |
| 2,826,564 | 3/1958 | Bovey et al. | 260/89.5 H |
| 3,102,103 | 4/1963 | Albrecht | 260/89.5 R |
| 3,378,609 | 4/1968 | Tosick et al. | 260/89.5 H |
| 3,457,247 | 7/1969 | Katsushima et al. | 260/89.5 H |
| 3,532,659 | 10/1970 | Hager et al. | 260/79.7 |
| 3,644,241 | 2/1972 | Zalivene | 260/86.1 R |
| 3,654,244 | 4/1972 | Pittman et al. | 260/79.7 |
| 3,843,579 | 10/1974 | Eanzel | 260/29.6 H |
| 3,844,999 | 10/1974 | Petrella | 260/29.6 F |
| 3,909,476 | 9/1975 | Mandell, Jr. | 260/29.6 H |
| 3,920,614 | 11/1975 | Kirimotz et al. | 260/29.6 F |
| 3,950,315 | 4/1976 | Clear | 526/245 |

FOREIGN PATENT DOCUMENTS

| | | | |
|---|---|---|---|
| 703,435 | 2/1954 | United Kingdom | 260/89.5 H |

*Primary Examiner*—Joseph L. Schofer
*Assistant Examiner*—Peter F. Kulkosky
*Attorney, Agent, or Firm*—Herbert S. Sylvester; Murray M. Grill; Norman Blumenkopf

[57] ABSTRACT

A copolymer adapted be used for applying a non-permanent soil-release finish to fabrics comprising a copolymer of acrylic acid and 1,1 — dihydroperfluorooctyl methacrylate. A ratio of one monomer to the other is respectively about 21:1 to 5:4 by weight. The composition is particularly useful for applying a soil-release finish in the rinse cycle of a home laundry process.

3 Claims, No Drawings

4,043,965

COPOLYMER OF ACRYLIC ACID AND 1,1-DIHYDROPERFLUOROOCTYL METHACRYLATE USEFUL FOR APPLYING NON-PERMANENT SOIL RELEASE FINISH

This application is a continuation-in-part of my copending application, Ser. No. 414,880, filed on Nov. 12, 1973, now U.S. Pat. No. 3,912,681, which in turn is a continuation-in-part of Ser. No. 249,089, filed on May 1, 1972, now U.S. Pat. No. 3,836,496, the benefit of which filing dates are claimed.

BACKGROUND OF THE INVENTION

This invention relates to a copolymer which can be conveniently used in a composition in the rinse cycle of a home laundry procedure for treating a textile substrate to impart a soil-release characteristic thereto.

The genesis of synthetically produced textile fibers has brought about a tremendous effort in the textile industry along numerous avenues. There has been much research effort directed to the improvement of these synthetic fibers per se, and improved blends of synthetically produced fibers with natural fibers, i.e., cellulose fibers or keratinous fibers. Results of this research have been successful, and the direction of research has been directed from the synthetic polymer per se and/or blends of said polymers with other naturally occurring fibers, and, more specifically, to the physical characteristics and/or endurance properties of garments produced from synthetic fabrics and/or fabric produced from blends of synthetic fibers and naturally occurring fibers.

Much research has been directed to the attainment of a garment having improved soil-release properties. Many of the synthetically produced fibers that are presently being incorporated in blends with naturally occurring fibers have a propensity to accept and retain oily grime and dirt. Accordingly, when the garment is being worn the soil and/or oily materials accumulate on the garment and settle in the fabric. Once the garment becomes soiled, it is then subjected to a cleaning process for removal of the dirt and/or oily deposits, and only a dry cleaning process will successfully clean the garment.

The cleaning process normally employed, however, is washing in a conventional home washing machine by the housewife. During a wash cycle, it is virtually impossible to remove the soil and/or oily stains from the garment, and secondly, assuming that the undesirable materials are removed from the garment or a fairly clean garment is being washed, soil remaining in the wash water is redeposited onto the garment prior to the end of the wash cycle. Hence, when the garment is removed from the washing machine and subsequently dried, it has not been properly cleaned. Such a condition, heretofore unavoidable, is quite disadvantageous in that the garment after being worn never again assumes a truly clean appearance, but instead tends to gray and/or yellow due to the soil and/or oily materials deposited and remaining thereon. Further use and washing of the garment increases the intensity of graying to the point that ultimately the garment is unacceptable for further wear due to its discoloration. The process of the present invention solves the soiling problem as hereinafter described.

The problem heretofore confronted with fabrics having synthetic fibers incorporated therein, or made entirely of synthetic fibers, has been that the synthetic fibers, as well as being hydrophobic, are oleophilic. Therefore, while the olephilic characteristics of the fiber permit oil and grime to be readily embedded therein, the hydrophobic properties of the fiber prevent water from entering the fiber to remove contaminants therefrom.

Attempts have been made to reduce the oleophilic characteristics of these synthetic fibers by coating the fibers with a coating that is oleophobic, i.e., will hinder the attachment of soil or oily materials to the fibers. Many polymer systems have been proposed which are capable of forming a film around the fibers that constitute the textile material, particularly acid emulsion polymers prepared from organic acids having reactive points of unsaturation. These treating polymers are known as soil-release agents.

The term "soil-release" in accordance with the present invention refers to the ability of the fabric to be washed or otherwise treated to remove soil and/or oily materials to the fabric, but hinders such attachment and renders the heretofore uncleanable fabric now susceptible to a successful cleaning operation. While the theory of operation is still somewhat of a mystery, soiled, treated fabric when immersed in detergent — containing wash water experience an agglomeration of oil at the surface. These globules of oil are then removed from the fabric and rise to the surface of the wash water. This phenomenon takes place in the home washer during continued agitation, but the same effect has been observed even under static conditions. In other words, a strip of polyester/cotton fabric treated with a dilute solution of the composition of the present invention and soiled with crude oil, when simply immersed in a detergent solution will lose the oil even without agitation.

Concentrated solutions of soil-release polymers have been padded onto fabrics by textile manufacturers to impart a permanent soil-release finish to the fabric. As the amount of soil-release polymer on the fabric is increased, the ability of the fabric to release soil is increased. However, fabrics with this permanent soil-release finish possess many disadvantages. As the amount of soil-release polymer on the fabric is increased, the fabric has a tendency to become stiffer and lose the desirable hand characteristic of the fabric. Thus, the upper limit on the amount of soil-release polymer to be used is determined by economics and the resulting adverse effect on the fabric. Fabrics with a heavy application of soil-release polymer do not have the same desirable appearance and hand as the same fabrics without the soil-release coating. Furthermore, practically speaking, there is a set range of soil-release agent that can be applied, dictated by commercial success.

Some soil-release polymers are effective fabric treating agents even at very low levels on the fabric, at which levels the appearance and hand of the fabric are not adversely affected. This is an ideal method of treating a synthetic fiber containing fabric each time the fabric is washed.

Certain polycarboxylate polymers, such as partially hydrolyzed acrylamide polymers and certain copolymers of methacrylic acid with ethyl acrylate, are very effective soil-release agents at low levels on the fabric. However, these polymers cannot be deposited onto fabrics from dilute solution, as the polymers are so soluble in water that they will not deposit onto the fabric from dilute solution.

SUMMARY OF THE INVENTION

There has now been discovered a new copolymer which is also a very effective non-permanent soil-release finish and which can be applied to fabrics using a dilute aqueous solution thereof if the pH of the solution is lowered to about 3, most conveniently with a non-oxidizing mineral acid, such as, sulfuric acid, hydrochloric acid and phosphoric acid. Lowering the pH of the solution to this level decreases the solubility of the polymer sufficiently to cause the soil-release polymer to deposit onto the fabric. A dilute solution of the soil-release polymer and sufficient acid to lower the pH of the treating water to about 3, could easily be made up in the rinse cycle of a typical home laundry process.

Polycarboxylate polymers found to be effective soil-release agents when applied from dilute solution at a pH of about 3 are those polycarboxylate polymers having an acid equivalent weight (i.e., gram per mole of carboxylate) in the range of from about 75 to 150. The preferred acid equivalent weight for these polymers for use in the present invention is about 75 to about 130. The acid component of the copolymer may be derived from an ethylenically unsaturated carboxylic acid, such as acrylic, methacrylic, ethacrylic, crotonic or the like. The acrylate or methacrylate may be comprised of about 1 to 8 carbon atoms such as methyl, ethyl, propyl, butyl and the like. The ester portion may furthermore be substituted such as by hydroxy or perhalo groups or both, namely, the dihydroperfluoro-octyl moiety. The preferred copolymer consists essentially of acrylic acid and 1,1-dihydroperfluorooctyl methacrylate in a weight ratio of about 21:1 to 5:4.

The copolymers of the instant invention are produced by conventional procedures known in the art for polymerization. The new polymers are conveniently prepared by subjecting a suitable mixture of the components to conditions fostering polymerization through the ethylenically unsaturated groups. The polymerization may be induced by high energy radiation or by the action of free radicals.

For the preparation of emulsions of the invention, the polymerizations are carried out in aqueous dispersion, in the presence preferably of a water-soluble initiator such as potassium persulfate, ammonium persulfate, similar initiators or other known free radicals, or by use of high energy radiation (X-rays, gamma-rays) and advantageously also in the presence of a surface-active agent to facilitate solubilization of the comonomers. The reaction is preferably carried out in the absence of free oxygen and most preferably under a blanket of neutral gas (e.g., nitrogen, argon, etc.). After completion of the addition of the monomers, the reaction mixture is then heated for a period up to several hours or more to complete the reaction. Preferred reaction temperatures range from — 10° to 180° C and most preferably about 30°–90° C to avoid violent reaction and undesirable side reactions. The resulting stable aqueous emulsion contains the resinous polymers, above-defined. If desired, an activating agent such as an alkali metal sulfite or bisulfite, e.g., sodium, potassium, etc., sulfites and metabisulfites can be added to the polymerization reaction mixture in about the same amount as the polymerization initiator in which case lower polymerization temperatures may be used. Chain regulators such as hexyl, cetyl, dodecyl, myristyl, etc., mercaptans can also be employed in the polymerizations.

The catalysts or initiators employed in connection with the present invention include the common organic free radical initiator such as tertiary-butyl peroxy pivalate, ditertiarybutyl peroxide, organic azo compounds such as $\alpha,\alpha$-azodiisobutyronitrile and the like. Other free radical generating catalyst systems include potassium persulfate and other peroxides. As can readily be seen, the instant invention is not restricted to any particular catalyst. The catalyst is used in a concentration sufficient to effect a substantially complete polymerization at a suitable reaction rate. In this regard, it is noted that an excess of catalyst does not have a particularly detrimental effect on the end product. However, such an excess should be controlled to the extent possible. The catalyst is generally employed in concentrations of up to about 2% by weight of the monomers. Thus, the amount of catalyst or initiator can be varied over a wide range but advantageously is present in an amount from about 0.01 to 2.0 weight percent based on the total weight of materials being polymerized.

It may be some instances be preferred to conduct the polymerization at neutral and alkaline pH's, i.e., a pH of over about 7 rather than on the acid side. In order to maintain an alkaline pH range, it is conventional to employ a buffer such as disodium hydrogen phosphate or the like. The pH can be initially raised to the proper level by use of sodium hydroxide or the like.

It has also been found that the stable emulsions of the class described above can be prepared without the use of emulsifying agents or protective colloids, although it has been observed that it is preferable to add such materials to the emulsion recipe in order to obtain high conversion and greater stability of the resultant emulsions.

Suitable surface-active agents which can be used include Igepal CO-630 (a commercial surfactant), fatty acid soaps, fatty alcohol sulfates such as sodium lauryl sulfate, potassium lauryl sulfate, etc., alkali metal salts of aromatic sulfonic acids, e.g., sodium isobutylnaphthalene sulfonate, etc., phosphate esters of polyethoxy alkylphenols, sulfosuccinic esters, $v$-stearaminopropyl, dimethyl $\beta$-hydroxyethyl ammonium chloride, and the like.

The emulsions can also be compounded with additives such as pigments, salts, wetting agents, resins, waxes and the like, thus providing a wide spectrum of products having wide industrial application. Polymers of molecular weights ranging from about two thousand to about five million have been found to be effective; although polymers having a molecular weight of about five hundred thousand to about one million are preferred. It will be appreciated by one skilled in the art that the conditions herein referred to may be varied from a particular suggested optimum figure either because the success of the process does not depend upon the maintenance of the condition with such exactitude, or because the alteration of a particular condition may be compensated for by the alteration of another condition operating concurrently.

The pH of the treating composition is preferably lowered with sulfuric acid, although other mineral acids such as hydrochloric acid, phosphoric and least preferably nitric acid could also be used to adjust the pH. The acid can be employed either in the concentrated form or as dilute acid. Generally speaking, the acid will be employed in amounts sufficient to lower the pH of the water to about 3. It is to be understood that the foregoing will naturally be dictated by the concentration of the acid and the initial pH of the water (laundry water is generally about 7-8) as well as the copolymer.

The ratio of the acid to the copolymer will, however, generally be in the range of about 1.5:1 to about 2.0:1 where sulfuric acid is employed, the acid is preferably 4 molar.

The composition will generally be employed in amounts, such that the concentration thereof in the rinse water will be about 0.01 to about 1.0%, preferably about 0.03 to about 0.07.

It is, of course, to be understood that ordinarily the composition will be marketed and packaged as a concentrated liquid such that same need only be added to the rinse cycle, such as for instance, to the drum of a laundry machine. In the latter instance, the operator need only remove the composition from its container and add same to the rinse cycle, the subsequent dilution with water thereafter yielding a dilute aqueous solution of the same.

The polymers of the composition of the present invention form a hydrophilic film on the fibers upon drying, and afford soil releasability and soil repellency. Each subsequent treatment serves to enhance the soil-release characteristics of the fabric substrate. Since the soil-release finish can be applied with each laundering, the soil-release effect is not lost with repeated washings.

The soil-release properties of pure cellulosic fiber fabrics are much better than those of synthetic fiber containing fabrics, e.g., polyester fibers, in that the synthetic polyester fibers are hydrophobic and thus prevent the ingress of water that is necessary for cleaning the fabric, and also possess and electrical charge that attracts soil particles.

The compositions of the present invention may be used to treat a wide variety of textile materials made exclusively from synthetic polymer materials as well as blends of natural and synthetic fibers. Examples of synthetic fibers which may be successfully employed in the practice of the present invention include those made with polyamide, acrylic, and polyester fibers. Blends of natural and synthetic fibers which may be successfully treated with the compositions of the present invention include fabrics containing 50% polyester/50% cotton, 65% polyester/35% cotton, etc., also may be combined with cellulosic fibers. The compositions of the present invention are most effective on fabrics of pure polyester and blends of polyester and cotton with a permanent press finish.

DESCRIPTION OF THE PREFERRED EMBODIMENTS

EXAMPLE 1

To a liter autoclave there is charged an aqueous phase consisting of 272.0 g. $H_2O$, 40.0 g. Stepanol WAC (sodium lauryl sulfate 30% active), 4.0 g. $Na_2HPO_2$ and 0.5 g. 50% NaOH (to give a pH of 11.5) and 2.0 g. $K_2S_2O_8$. The autoclave is evacuated and filled with nitrogen (repeated 3 times) and then the following charge made: 10 parts acrylic acid and 1 part dihydroperfluoromethacrylate. The autoclave temperature is adjusted to 30° C and the charge reacted for 5 hours. After a total of 24 hours, the autoclave is opened and a latex obtained. This latex is coagulated with methanol and then water washed and vacuum dried.

EXAMPLE 2

This experiment illustrates the preparation of the polymer by suspension polymerization.

To a pressure vessel is charged an aqueous phase consisting of 100.0 g. $H_2O$, 1.6 g. PVP/VAC copolymer (60% PVP/40% PVAC) as a protective colloid, and 15.0 g. $Na_2HPO_4$. The air is removed by evacuation and nitrogen filling. There is then added a solution of 21 parts acrylic acid and 1 part dihydroperfluorooctyl methacrylate and 3.0 g. Lupersol 11 (t-butyl peroxypivalate--75% active), and the temperature is raised from 20° to 40°. After a total of 24 hours, the reaction mixture, suspended in water, is filtered and dried. The product is added to 1500 ml. methanol and 40 ml. concentrated sulfuric acid, heated with stirring. The mixture is neutralized with concentrated sodium hydroxide solution and filtered to recover the polymer.

EXAMPLES 3-5

The procedure and apparatus of example 1 is repeated except that the relative amounts of the two co-monomers is changed to 5:1 and 10:4, respectively. The same good results are obtained.

EXAMPLE 6

A number of copolymers are evaluated for their effectiveness in imparting soil-release characteristics to dacron polyester swatches. Identical dacron polyester swatches are treated with 0.05% aqueous solutions of the copolymers for 10 minutes in a tergotometer made pH of 3 with 4 molar sulfuric acid, and soil repellancy of the treated fabric is determined from the spreading time of a colored oil drop. The copolymers are rated as to their soil-release characteristics on dacron polyester swatches in Table 1. A rating of 3 indicates clean release in 30 seconds; a 2 rating means release in 100 seconds; and 1 rating means release in 500 seconds; a 0 rating means no release in 500 seconds.

The reflectance shows the ability of the polymer to prevent deposition of soil when in an alkaline solution. Although in use the soil-release polymer is applied in the rinse cycle from an acidic solution, the pH in the subsequent wash step is alkaline and the polymer, soluble in water at the higher pH, would then function as a soil antiredeposition agent.

The swatches may also be soiled by rubbing them on a plexiglas plate coated with Spangler's soil (skin soil) and allowed to age for three hours. The reflectance of the swatches in Rd units may then be measured.

TABLE I

| COPOLYMER | Acid Equivalent Weight | Rating |
|---|---|---|
| 10:1 acrylic acid: 1,1-dihydroperfluorooctyl methacrylate | 75 | 0 |
| 21:1 acrylic acid: 1,1 dihydroperfluorooctyl methacrylate | 80 | 0 |
| 20:1 acrylic acid: 1,1 dihydroperfluorooctyl methacrylate | 75 | 0 |
| 20:1 acrylic acid: 1,1 dihydroperfluorooctyl methacrylate | 110 | 1 |
| 10:1 acrylic acid: 1,1 dihydroperfluorooctyl methacrylate | 111 | 1 |
| 5:1 acrylic acid: 1,1 dihydroperfluorooctyl methacrylate (soluble fraction) | 89 | 0 |
| 10:4 acrylic acid: 1,1 dihydroperfluorooctyl methacrylate | 107 | 0 |
| 5:1 acrylic acid: 1,1 dihydroperfluorooctyl methacrylate (soluble fraction) | 120 | 2 |

TABLE I-continued

| COPOLYMER | Acid Equivalent Weight | Rating |
|---|---|---|
| 10:4 acrylic acid: 1,1 dihydroperfluorooctyl methacrylate (insoluble fraction) | 127 | 2 |

What is claimed is:

1. A stable aqueous emulsion containing a copolymer consisting essentially of acrylic acid and 1,1-dihydroperfluorooctyl methacrylate in a weight ratio of about 21:1 to 5:4.

2. The emulsion as defined in claim 1 wherein said copolymer has an acid equivalent of about 75 to 150.

3. A copolymer consisting essentially of acrylic acid and 1,1-dihydroperfluorooctylmethacrylate in a weight ratio of about 21:1 to 5:4.

* * * * *